(12) United States Patent
Miura et al.

(10) Patent No.: US 9,771,233 B2
(45) Date of Patent: Sep. 26, 2017

(54) SHEET CONVEYING DEVICE AND IMAGE READING APPARATUS

(71) Applicant: Brother Kogyo Kabushiki Kaisha, Nagoya (JP)

(72) Inventors: Katsuro Miura, Toyota (JP); Takayuki Akimatsu, Nagoya (JP)

(73) Assignee: Brother Kogyo Kabushiki Kaisha, Nagoya-Shi (JP)

( * ) Notice: Subject to any disclaimer, the term of this patent is extended or adjusted under 35 U.S.C. 154(b) by 0 days.

(21) Appl. No.: 14/851,156

(22) Filed: Sep. 11, 2015

(65) Prior Publication Data

US 2016/0090260 A1  Mar. 31, 2016

(30) Foreign Application Priority Data

Sep. 30, 2014  (JP) ................. 2014-199913

(51) Int. Cl.
*B65H 31/00* (2006.01)
*B65H 31/02* (2006.01)
(Continued)

(52) U.S. Cl.
CPC ............... *B65H 31/02* (2013.01); *B65H 1/04* (2013.01); *B65H 31/00* (2013.01); *G03G 15/60* (2013.01);
(Continued)

(58) Field of Classification Search
CPC .. B65H 1/04; B65H 2801/06; B65H 2801/09; B65H 2405/1117; B65H 2405/1124;
(Continued)

(56) References Cited

U.S. PATENT DOCUMENTS 6,612,561 B2 * 9/2003 Sekine ............... H04N 1/00519
271/145
6,848,685 B2 * 2/2005 Katsuyama ............ B41J 13/103
271/162
(Continued)

FOREIGN PATENT DOCUMENTS

JP  05077507 A * 3/1993
JP  2002-145457 A  5/2002
(Continued)

*Primary Examiner* — Ernesto Suarez
(74) *Attorney, Agent, or Firm* — Burr & Brown, PLLC

(57) ABSTRACT

A sheet conveying device, including: a conveyor; a first supporter configured such that, when located at its closed position, a first surface thereof partially forms an exterior surface of the device and such that, when located at its open position, a second surface thereof supports the sheet to be supplied to the conveyor; a second supporter configured such that, when located at its closed position, a first surface thereof partially forms the exterior surface of the device and such that, when located at its open position, a second surface thereof supports the sheet output from the conveyor; and a link configured such that, when the first supporter is moved from the closed position to the open position, the link transmits a force from the first supporter to the second supporter and thereby moves the second supporter from the closed position to the open position in conjunction with the first supporter.

20 Claims, 9 Drawing Sheets

(51) Int. Cl.
  *B65H 1/04* (2006.01)
  *H04N 1/00* (2006.01)
  *G03G 15/00* (2006.01)

(52) U.S. Cl.
  CPC ..... *H04N 1/00588* (2013.01); *H04N 1/00599* (2013.01); *B65H 2402/31* (2013.01); *B65H 2402/40* (2013.01); *B65H 2402/63* (2013.01); *B65H 2405/11164* (2013.01); *B65H 2405/12* (2013.01); *B65H 2405/324* (2013.01); *B65H 2405/3321* (2013.01); *B65H 2801/39* (2013.01); *H04N 2201/0081* (2013.01)

(58) Field of Classification Search
  CPC .. B65H 2405/324; B65H 31/00; G03G 15/60; G03G 15/602; G03G 15/605
  USPC ........................................ 271/3.14, 162, 163
  See application file for complete search history.

(56) References Cited

U.S. PATENT DOCUMENTS

| | | | | |
|---|---|---|---|---|
| 7,243,915 B2 * | 7/2007 | Wong | ............... | B65H 1/04 271/162 |
| 7,258,334 B2 * | 8/2007 | Cheng | ............... | B41J 13/103 271/162 |
| 7,823,877 B2 * | 11/2010 | Yoshioka | ............... | H04N 1/00519 271/162 |
| 8,590,882 B2 * | 11/2013 | Furuyama | ............... | B65H 1/04 271/145 |
| 8,964,263 B1 * | 2/2015 | Sakakibara | ............... | H04N 1/00535 358/474 |
| 9,083,831 B2 * | 7/2015 | Niikawa | ............... | H04N 1/00543 |
| 2002/0056957 A1 | 5/2002 | Sekine | | |
| 2010/0252987 A1 | 10/2010 | Furuyama et al. | | |
| 2011/0242624 A1 | 10/2011 | Takeuchi et al. | | |
| 2012/0155941 A1 | 6/2012 | Kozaki et al. | | |
| 2015/0274448 A1 * | 10/2015 | Wang | ............... | B65H 3/0684 271/264 |
| 2016/0083204 A1 * | 3/2016 | Murodate | ............... | B65H 1/04 271/264 |

FOREIGN PATENT DOCUMENTS

| | | | | |
|---|---|---|---|---|
| JP | 2006203562 A | * | 8/2006 | |
| JP | EP 1950158 A1 | * | 7/2008 | ......... H04N 1/00525 |
| JP | 2010-245624 A | | 10/2010 | |
| JP | 2011-211478 A | | 10/2011 | |
| JP | 2012-126530 A | | 7/2012 | |

* cited by examiner

SHEET CONVEYING DEVICE AND IMAGE READING APPARATUS

CROSS REFERENCE TO RELATED APPLICATION

The present application claims priority from Japanese Patent Application No. 2014-199913, which was filed on Sep. 30, 2014, the disclosure of which is herein incorporated by reference in its entirety.

BACKGROUND

Technical Field

The following disclosure relates to a sheet conveying device and an image reading apparatus.

Description of the Related Art

There is known an automatic document feeder (ADF) of an image reading apparatus in which two movable members disposed adjacent to each other form an upper exterior surface of the ADF as one example of the sheet conveying device.

The known ADF has a cover member and an output tray which are configured to be pivotable. While the device is not in use, the cover member and the output tray form an exterior surface of the device.

When the device is used, on the other hand, the cover member is pivoted in a direction in which the cover member is opened. Thus, one surface of the cover member opposite to another surface thereof that functions as the exterior surface is utilized as for supporting sheets to be conveyed. Further, the output tray is pivoted such that one end portion thereof nearer to the cover member is moved downward. Thus, one surface of the output tray that functions as the exterior surface is utilized as a sheet receiving surface for receiving sheets that have been output.

SUMMARY

In the ADF constructed as described above, the sheet receiving surface of the output tray that also functions as the exterior surface is always exposed to outside. Thus, dust is likely to accumulate on the sheet receiving surface, as compared with an arrangement in which the sheet receiving surface is not exposed to outside. Further, there is a possibility that the sheet receiving surface may be stained. If a document is output onto the output tray on which dust is accumulated or to which stains are attached, there is a risk that the document is stained.

In general, it is required that the exterior surface be excellent in design. Specifically, the exterior surface is required to have good aesthetic appearance. In contrast, the sheet receiving surface is required to have a high functionality for enabling a document to be smoothly output. It is, however, difficult to achieve excellent design and high functionality at the same time. For instance, there is a demand, on the one hand, that the exterior surface should be smooth and flat without containing protrusions or indentations in view of design, but there is a demand, on the other hand, that the sheet receiving surface should have ribs for permitting the document to be smoothly output. These demands are inconsistent with each other.

In view of the situations described above, it is preferable to provide a sheet conveying device and an image reading apparatus which can prevent staining of sheets and which can achieve, at the same time, a high functionality while in use and excellent design while not in use.

In one aspect of the disclosure, a sheet conveying device includes: a conveyor configured to convey a sheet along a conveyance path; a first supporter configured to be moved between a closed position and an open position and having a first surface and a second surface opposite to the first surface, the first supporter being configured such that, when located at the closed position, the first surface partially forms an exterior surface of the sheet conveying device and such that, when located at the open position, the second surface supports the sheet to be supplied to the conveyor; a second supporter configured to be moved between a closed position and an open position and having a first surface and a second surface opposite to the first surface, the second supporter being configured such that, when located at the closed position, the first surface partially forms the exterior surface of the sheet conveying device and such that, when located at the open position, the second surface supports the sheet output from the conveyor; and a link configured such that, when the first supporter is moved from the closed position to the open position, the link transmits a force from the first supporter to the second supporter and thereby moves the second supporter from the closed position to the open position in conjunction with the first supporter.

In another aspect of the disclosure, an image reading apparatus includes a sheet conveying device configured to convey, along a conveyance path, a sheet whose image is to be read, wherein the sheet conveying device includes: a conveyor configured to convey the sheet along the conveyance path; a first supporter configured to be moved between a closed position and an open position and having a first surface and a second surface opposite to the first surface, the first supporter being configured such that, when located at the closed position, the first surface partially forms an exterior surface of the sheet conveying device and such that, when located at the open position, the second surface supports the sheet to be supplied to the conveyor; a second supporter configured to be moved between a closed position and an open position and having a first surface and a second surface opposite to the first surface, the second supporter being configured such that, when located at the closed position, the first surface partially forms the exterior surface of the sheet conveying device and such that, when located at the open position, the second surface supports the sheet output from the conveyor; and a link configured such that, when the first supporter is moved from the closed position to the open position, the link transmits a force from the first supporter to the second supporter and thereby moves the second supporter from the closed position to the open position in conjunction with the first supporter.

BRIEF DESCRIPTION OF THE DRAWINGS

The objects, features, advantages, and technical and industrial significance of the present disclosure will be better understood by reading the following detailed description of embodiments, when considered in connection with the accompanying drawings, in which.

DETAILED DESCRIPTION OF THE EMBODIMENTS

There will be hereinafter explained a sheet conveying device and an image reading apparatus according to one embodiment.

1. First Embodiment

Configuration of MFP

Figure 1A:
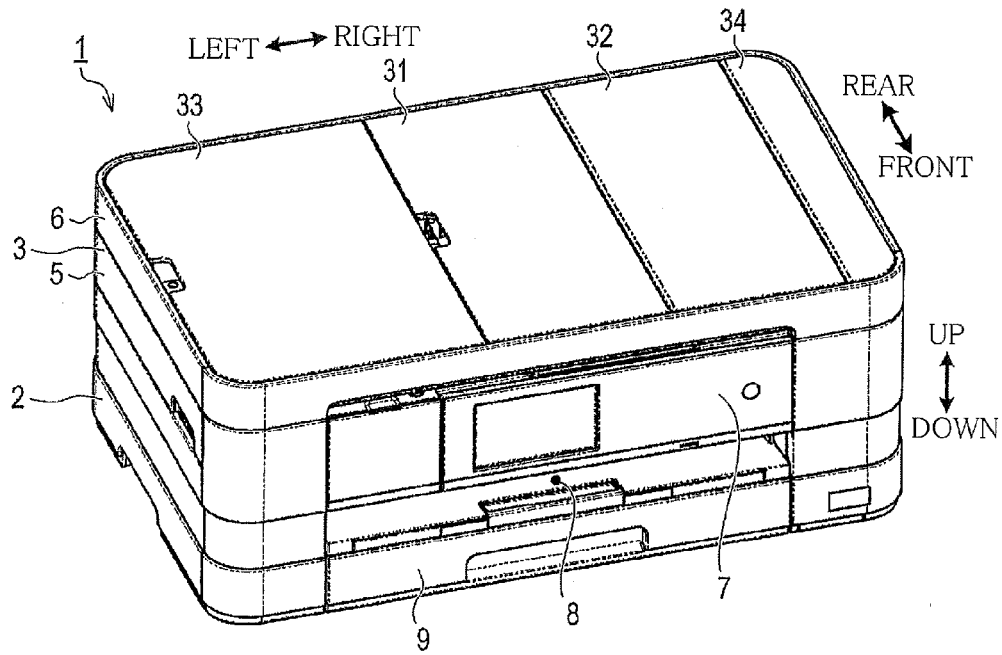
FIG. 1A is a perspective view showing a state in which an ADF unit of an MFP according to a first embodiment is located at its closed position.
Figure 1B:
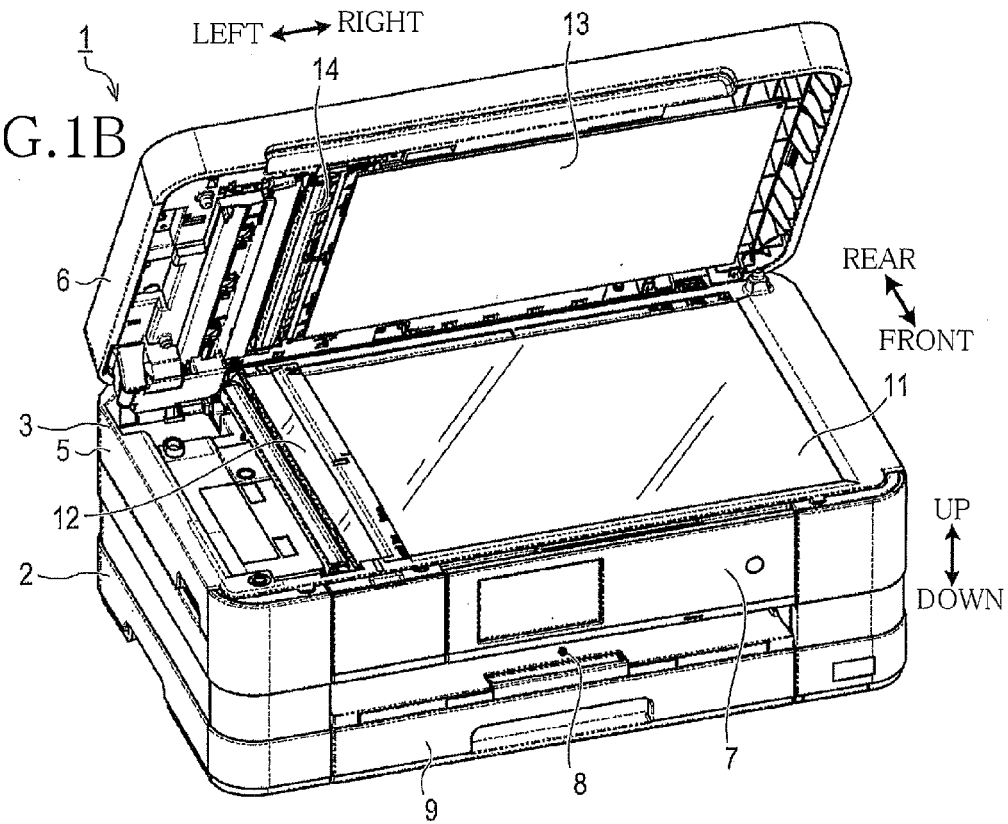
FIG. 1B is a perspective view showing a state in which the ADF unit of the MFP is located at its open position.

A multi-function peripheral (MFP) 1 shown in FIGS. 1A and 1B has a configuration corresponding to the sheet conveying device and the image reading apparatus described above. For easy understanding of a relative positional relationship of components of the MFP 1, directions such as an up-down direction, a front-rear direction, and a right-left direction are indicated in the drawings, and the following explanation will be made referring to the directions. In the following explanation, the up-down direction is a direction orthogonal to the horizontal plane in a case where the MFP 1 is placed on the horizontal plane. A frontward direction is a direction in which an operation panel 7 (described below) is oriented. A rearward direction is a direction opposite to the frontward direction. The right-left direction is a right-left direction in a case where the MFP 1 is viewed from a front thereof. It is noted that orientations of movable components may be changed and directions indicated in the drawings are not always maintained.

As shown in FIGS. 1A and 1B, the MFP 1 includes a main body unit 2 and a reading unit 3 (as one example of the image reading apparatus). In the main body unit 2, there are provided: a controller configured to control components and devices of the MFP 1; an image forming unit configured to form an image on a recording medium by an ink jet method; a LAN communication unit configured to perform communication with various devices through Local Area Network (LAN); and so on.

The reading unit 3 includes a scanner unit 5 and an ADF unit 6 (as one example of the sheet conveying device). The reading unit 3 will be later explained in detail. The operation panel 7 is provided on the front surface of the MFP 1. The operation panel 7 includes: input devices (e.g., a touch panel, buttons, and switches); and display devices (e.g., a liquid crystal display and lamps).

An outlet opening 8 is formed under the operation panel 7. A medium supply cassette 9 is installed under the outlet opening 8. When an image is formed on the recording medium in the main body unit 2, the recording medium stored in the medium supply cassette 9 is conveyed to the image forming unit in the main body unit 2, and the image forming unit forms an image on the recording medium. The recording medium on which an image has been formed is subsequently output from the image forming unit to the outlet opening 8.

Details of Image Reading Unit

The reading unit 3 is mounted on the main body unit 2. The reading unit 3 is pivotable about an axis, as a pivot center, extending in the right-left direction in the vicinity of an upper rear end of the main body unit 2. When pivoted, the reading unit 3 is moved between a closed position and an open position. The main body unit 2 has an opening (not shown) formed in its upper surface. When the reading unit 3 is located at the closed position, the opening of the main body unit 2 is closed by the reading unit 3. When the reading unit 3 is located at the open position, the main body unit 2 is exposed. Maintenance of components such as the image forming unit housed in the main body unit 2 can be performed through the opening.

The reading unit 3 can be used as a flatbed image scanner and as an ADF image scanner. The ADF unit 6 is mounted on the scanner unit 5. The ADF unit 6 is pivotable about an axis, as a pivot center, extending in the right-left direction in the vicinity of an upper end of the scanner unit 5. When pivoted, the ADF unit 6 is moved between a closed position and an open position. When the reading unit 3 is used as the flatbed image scanner, the ADF unit 6 functions as a cover for covering a document sheet placed on an upper surface of the scanner unit 5.

As shown in FIG. 1B, a first platen 11 and a second platen 12 are disposed on the upper surface of the scanner unit 5. Each of the first platen 11 and the second platen 12 is formed of a transparent plate such as a glass plate or an acrylic plate. A first pressing portion 13 and a second pressing portion 14 are disposed on a lower surface of the ADF unit 6.

When the reading unit 3 is used as the flatbed image scanner, an object to be read is placed on the first platen 11 and the ADF unit 6 is moved to the closed position, so that the first pressing portion 13 comes into pressing contact with the object to be read, and the object to be read is thereby brought into close contact with the first platen 11. When the ADF unit 6 is moved to the closed position, the second pressing portion 14 faces the second platen 12 so as to leave, therebetween, a space through which one sheet can pass. When the reading unit 3 is used as the ADF image scanner, a sheet as the object to be read is conveyed along a conveyance path defined by the second platen 12 and the second pressing portion 14. At this time, the second pressing portion 14 prevents the sheet from floating above away from the second platen 12.

Figure 2:
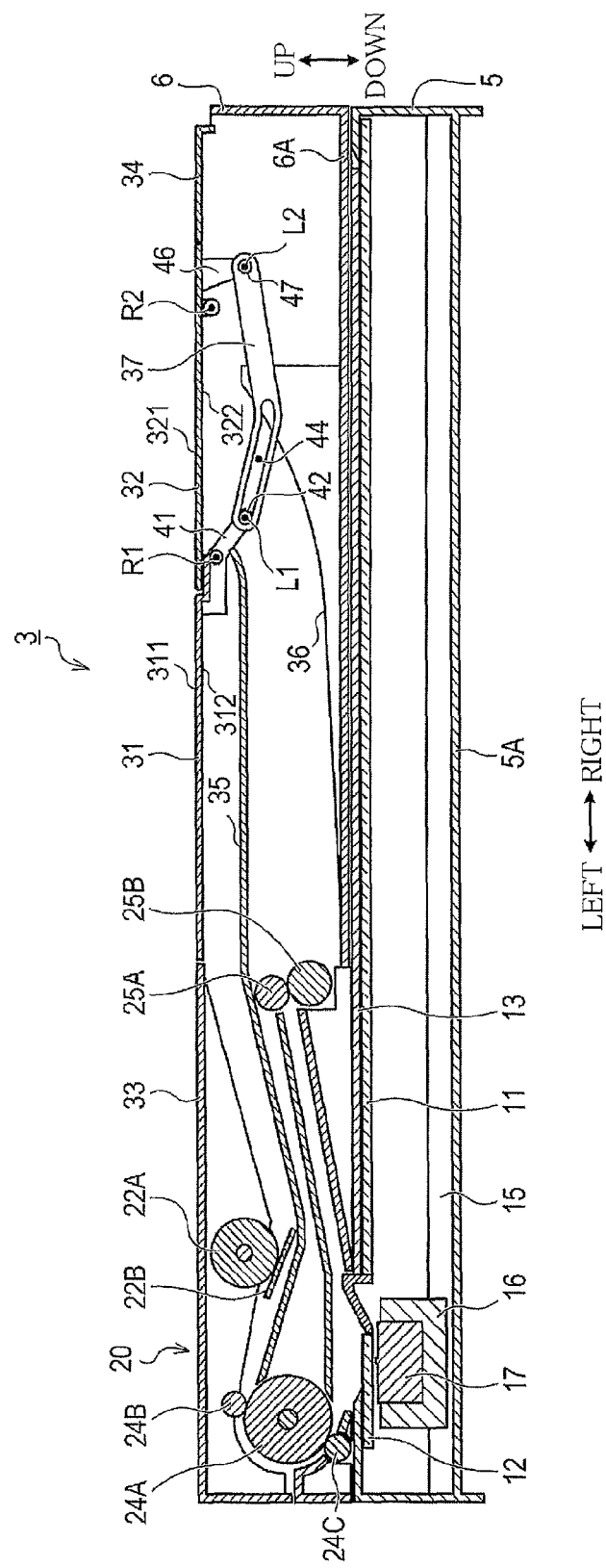
FIG. 2 is vertical cross-sectional view schematically showing a structure of a reading unit of the MFP of the first embodiment.

As shown in FIG. 2, a guide rail 15, a carriage 16, and an image sensor 17 are disposed in the scanner unit 5. The guide rail 15 extends in parallel with lower surfaces of the first platen 11 and the second platen 12. The guide rail 15 extends in the right-left direction in FIG. 2. The scanner unit 5 has a scanner base 5A formed of resin. The guide rail 15 is formed of resin integrally with the scanner base 5A. It is noted, however, that the guide rail 15 may be provided by a metal shaft, a metal plate or the like attached to the scanner base 5A.

The carriage 16 is mounted on the guide rail 15 such that the carriage 16 is supported so as to be reciprocable along the guide rail 15 in the right-left direction. The carriage 16 is coupled to an endless toothed belt (not shown). The toothed belt is tensioned between a pair of gears. When one of the pair of gears is driven and rotated by a motor (not shown) in both of forward and reverse directions, the toothed belt is driven and rotated in both of forward and reverse directions, and the carriage 16 is accordingly reciprocated in the right-left direction following the toothed belt.

The image sensor 17 is a one-dimensional image sensor including a plurality of reading elements arranged in one direction. In the present embodiment, a contact image sensor (CIS) is used as the image sensor 17. The image sensor 17 is mounted on the carriage 16 such that a main scanning direction, which is the direction of arrangement of the reading elements, coincides with the front-rear direction in FIG. 2 (i.e., a direction perpendicular to both of the right-left direction and the up-down direction in FIG. 2, namely, a direction perpendicular to sheet plane of FIG. 2) and such that the reading elements are directed upward in FIG. 2. The right-left direction in which the carriage 16, on which the image sensor 17 is mounted, is moved corresponds to a sub scanning direction.

As shown in FIG. 2, the ADF unit 6 includes a conveyor 20 configured to convey a sheet along a predetermined conveyance path. The conveyor 20 includes a separation roller 22A, a separation piece 22B, an inverting roller 24A, a first inverting pinch roller 24B, a second inverting pinch roller 24C, an output roller 25A, and an output pinch roller 25B.

In an instance where the reading unit 3 is used as the ADF image scanner, the sheet as the object to be read is conveyed in the conveyor 20. The sheets conveyed by the conveyor 20 are supplied by a supply roller (not shown) toward its downstream side in a sheet conveyance direction and are separated one by one by the separation roller 22A and the separation piece 22B. The separated sheet is guided by an outer circumference of the inverting roller 24A and a curved guide surface that is opposed to the outer circumference of the inverting roller 24A, and is conveyed further downstream while making a U-turn. On a downstream side of the inverting roller 24A, the sheet passes on an upper surface of the second platen 12 while contacting the upper surface, subsequently reaches the output roller 25A, and is finally output from the conveyor 20.

When the image sensor 17 reads an image of the sheet conveyed by the conveyor 20, the image sensor 17 stays stationary under the second platen 12. When the sheet conveyed by the conveyor 20 passes on the upper surface of the second platen 12 while contacting the upper surface of the second platen 12, the image sensor 17 reads the image of the sheet through the second platen 12.

In an instance where the reading unit 3 is used as the flatbed image scanner, the object to be read is placed on the first platen 11. When the image of the object is read, the carriage 16 is reciprocated in the right-left direction. The image sensor 17 is reciprocated in the right-left direction together with the carriage 16 and reads the image of the object through the first platen 11 in its rightward movement, for instance.

Details of Supply Tray and Output Tray

As shown in FIGS. 1A and 2, the ADF unit 6 includes a supply tray 31 (as one example of a first supporter), an output tray 32 (as one example of a second supporter), a left cover 33, and a right cover 34. As shown in FIG. 2, the ADF unit 6 has an ADF base 6A formed of resin. Each of the supply tray 31, the output tray 32, and the left cover 33 are supported so as to be pivotable relative to the ADF base 6A. One of a pivot shaft and a bearing, e.g., the pivot shaft, is provided on each of the pivotally supported members (the supply tray 31, the output tray 32, and the left cover 33) while the other of the pivot shaft and the bearing, e.g., the bearing, is provided on the ADF base 6A or a component fixed to the ADF base 6A.

When the supply tray 31, the output tray 32, the left cover 33, and the right cover 34 are located at respective positions shown in FIG. 2, these members 31, 32, 33, 34 constitute a part of an exterior surface (an upper surface) of the MFP 1 (or the reading unit 3 or the ADF unit 6). In this state, upper surfaces of the respective supply tray 31, output tray 32, left cover 33, and right cover 34 are substantially flush with one another, and the upper surface of the ADF unit 6 is accordingly flat as a whole.

Figure 3:
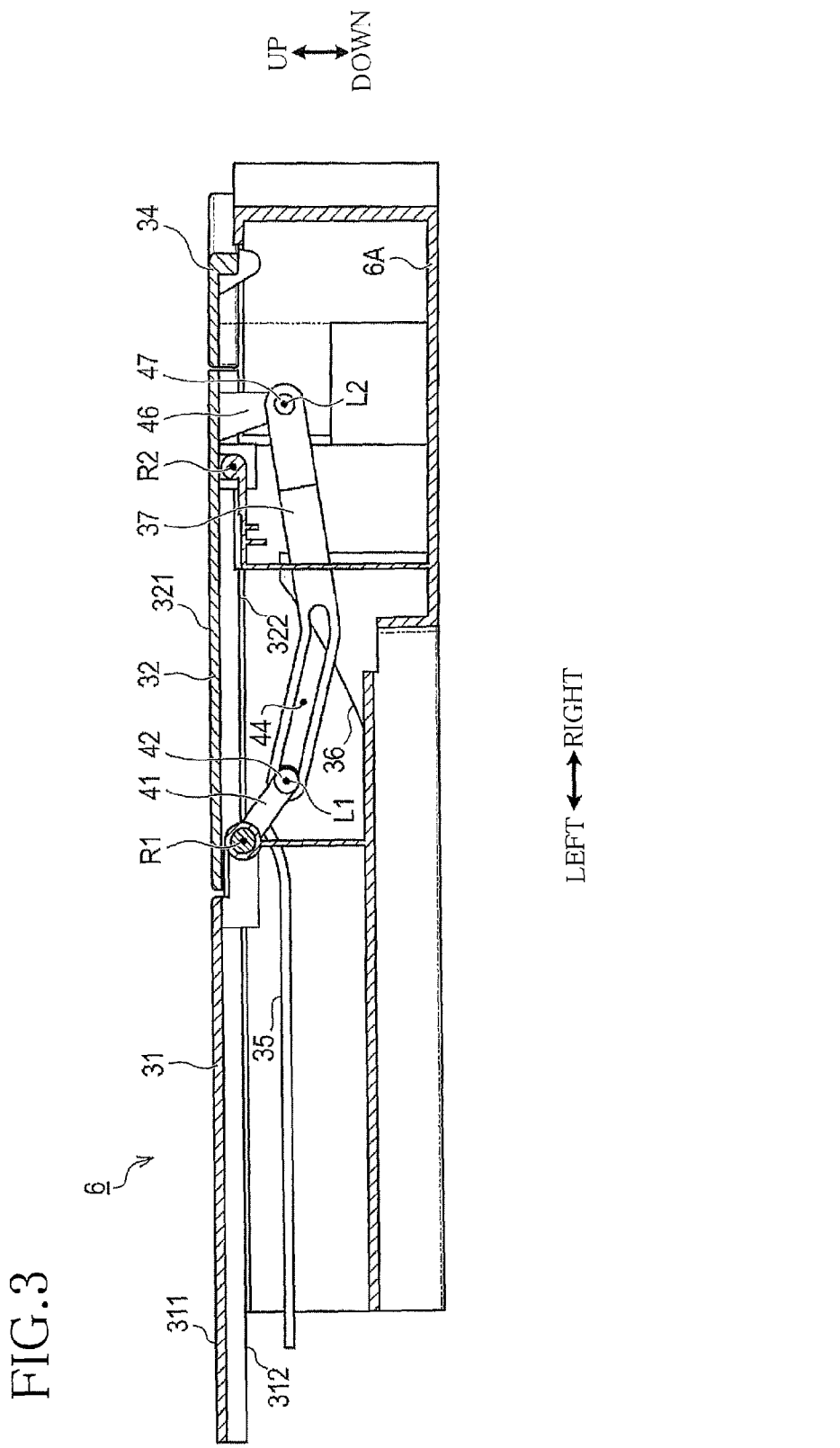
FIG. 3 is a vertical cross-sectional view showing a main portion of the MFP of the first embodiment in a state in which a supply tray and an output tray are located in respective closed positions.
Figure 4:
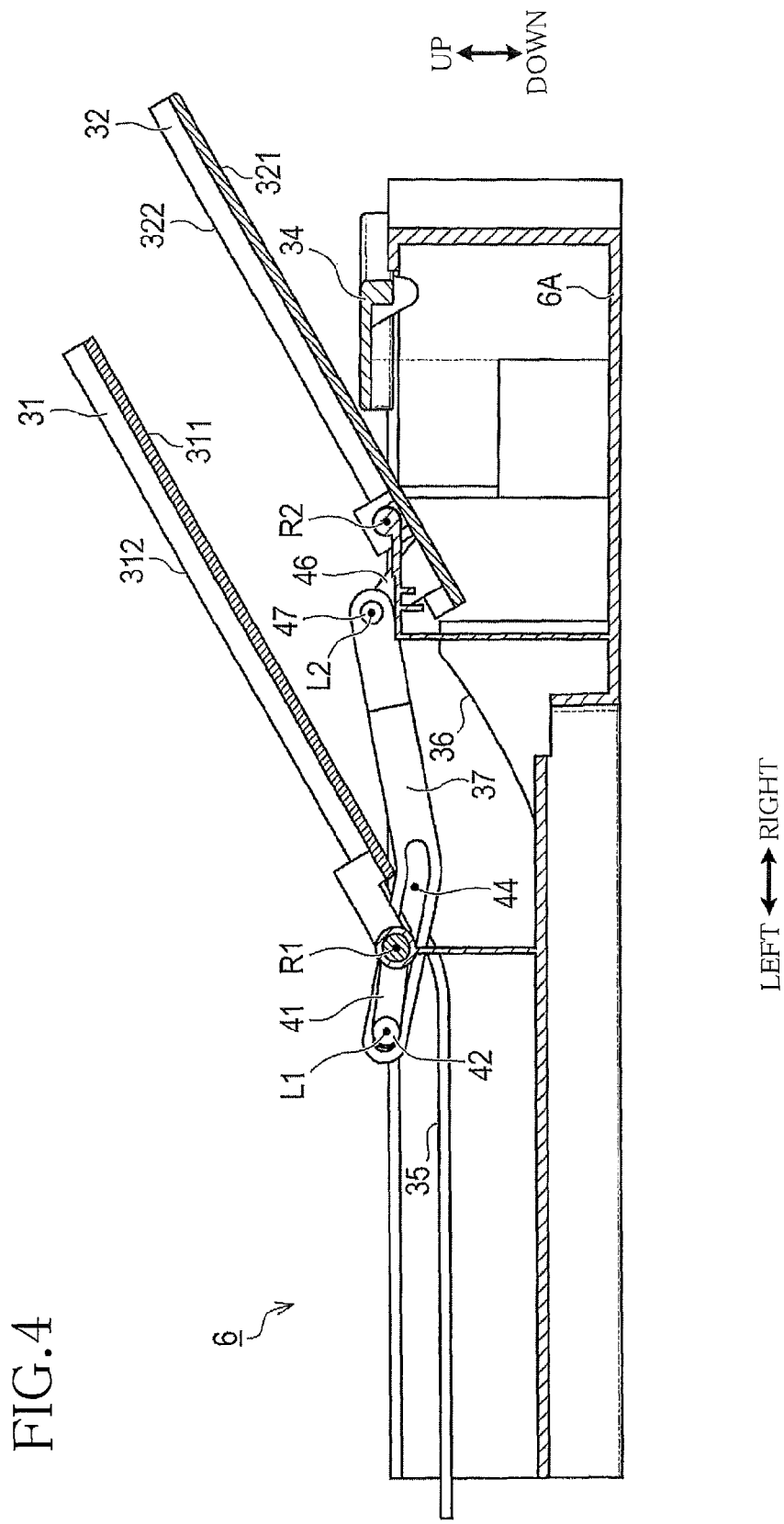
FIG. 4 is a vertical cross-sectional view showing the main portion of the MFP of the first embodiment in a state in which the supply tray and the output tray are located at respective open positions.

The supply tray 31 includes a first surface 311 and a second surface 312 that is opposite to the first surface 311. The supply tray 31 is configured to pivot about a pivot center axis R1 so as to be movable between a closed position (shown in FIGS. 3 and 5) and an open position (shown in FIG. 4). When the supply tray 31 is located at the closed position, the first surface 311 of the supply tray 31 partially defines the exterior surface of the ADF unit 6. When the supply tray 31 is located at the open position, the supply tray 31 can support, on the second surface 312 thereof, the sheet(s) to be supplied to the conveyor 20. A first sheet-passing portion 35 is provided downstream of the supply tray 31 in the sheet conveyance direction, as shown in FIG. 2. When the supply tray 31 is located at the open position shown in FIG. 4, a lower-left end portion of the supply tray 31 in FIG. 4 is located adjacent to a right end of the first sheet-passing portion 35. Thus, the sheet(s) to be supplied to the conveyor 20 can be supported by both of the supply tray 31 and the first sheet-passing portion 35. While not shown, at least one of the supply tray 31 and the first sheet-passing portion 35 is provided with a sheet guide configured to slide in the front-rear direction for regulating a position of the sheet in its width direction.

The output tray 32 includes a first surface 321 and a second surface 322 that is opposite to the first surface 321. The output tray 32 is configured to pivot about a pivot center axis R2 so as to be movable between a closed position (shown in FIG. 3) and an open position (shown in FIGS. 4 and 5). When the output tray 32 is located at the closed position, the first surface 321 of the output tray 32 partially defines the exterior surface of the ADF unit 6. When the output tray 32 is located at the open position, the output tray 32 can support, on the second surface 322 thereof, the sheet(s) output from the conveyor 20. As shown in FIG. 2, a second sheet-passing portion 36 is provided at a position that is downstream of the output roller 25A and the output pinch roller 25B in the sheet conveyance direction and that is upstream of the output tray 32 in the sheet conveyance direction. The second sheet-passing portion 36 is formed integrally with the ADF base 6A and has an upper surface curved such that an inclination angle gradually increases from its left end toward its right end. When the output tray 32 is located at the open position shown in FIG. 4, a lower left end portion of the output tray 32 in FIG. 4 is located adjacent to a right end of the second sheet-passing portion 36. Thus, the sheet(s) output from the conveyor 20 can be supported by both of the second sheet-passing portion 36 and the output tray 32.

The left cover 33 is configured to pivot so as to be movable between a closed position and an open position. It is noted, however, that FIG. 2 shows a state in which the left cover 33 is located at the closed position. When the left cover 33 is located at the closed position, the conveyor 20 is covered with the left cover 33. When the left cover 33 is moved to its open position (not shown), the conveyor 20 is exposed. Consequently, when the sheet is jammed in the conveyor 20, the left cover 33 is pivoted to the open position for removing the jammed sheet. The right cover 34 is configured not to move from its position shown in FIG. 2. The right cover 34 may be configured to be movable or may be configured to be detachable from the ADF base 6.

Figure 5:
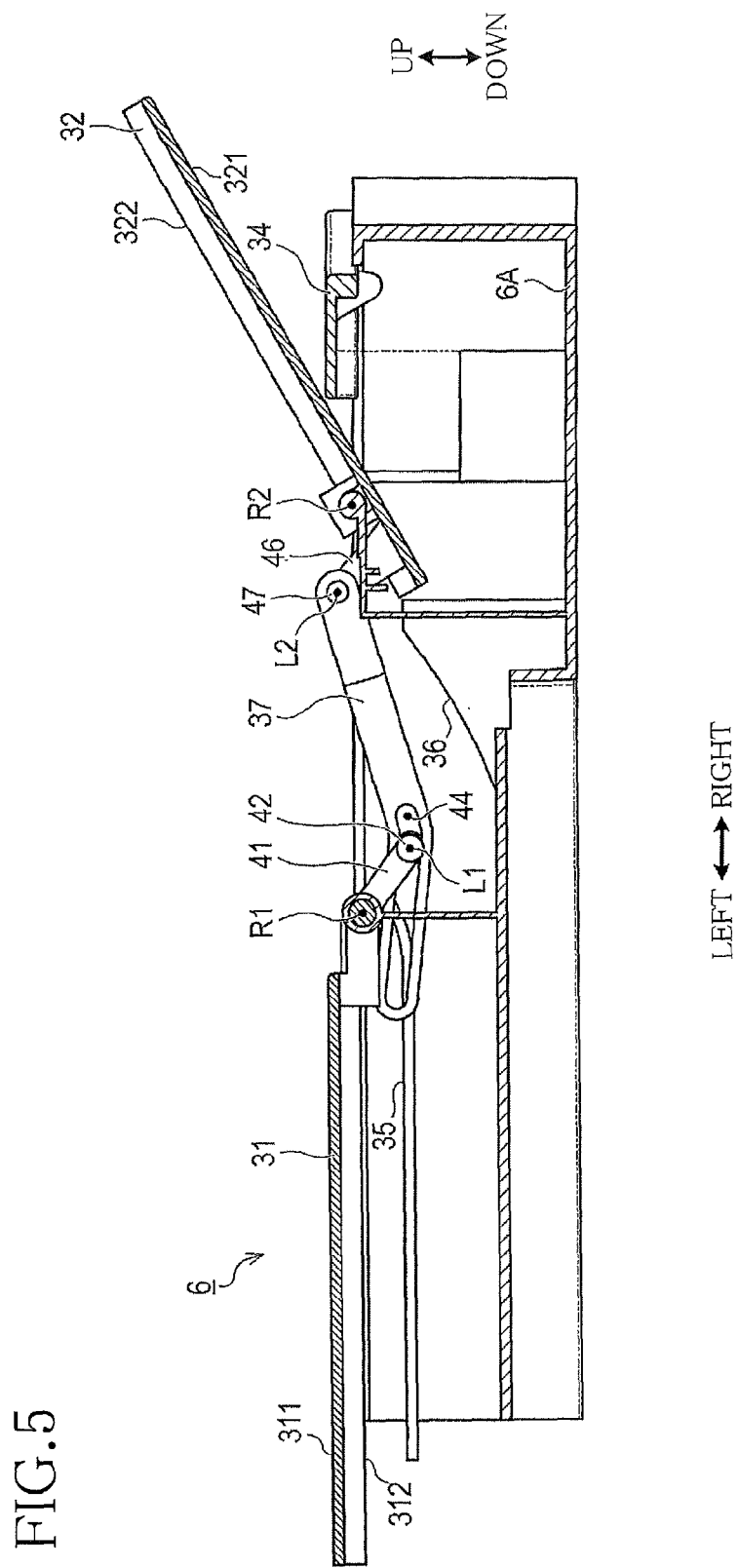
FIG. 5 is a vertical cross-sectional view showing the main portion of the MFP of the first embodiment in a state in which the supply tray is located at the closed position and the output tray is located at the open position.
Figure 6:
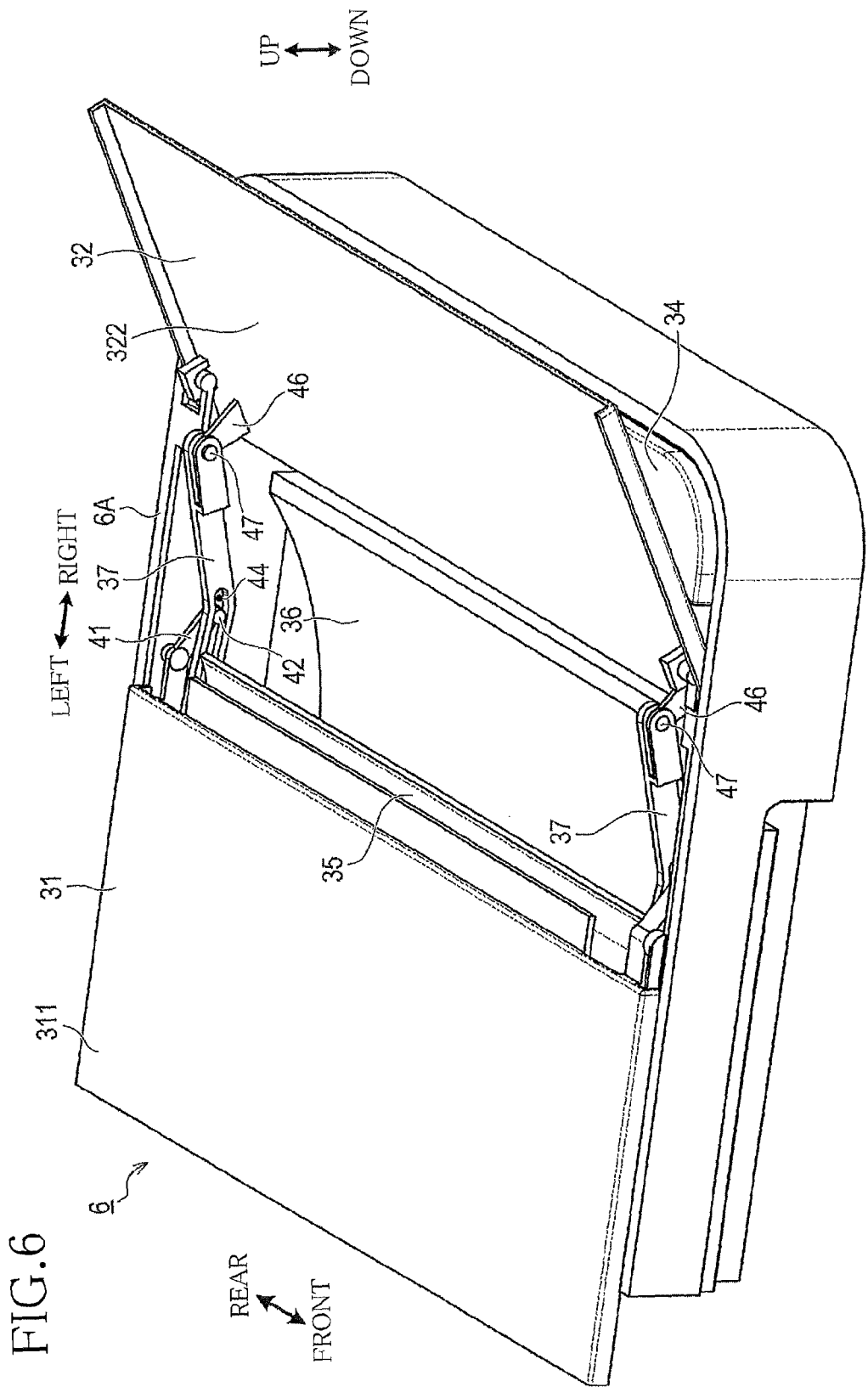
FIG. 6 is a perspective view showing the main portion of the MFP of the first embodiment in the state in which the supply tray is located at the closed position and the output tray is located at the open position.

The supply tray 31 and the output tray 32 are coupled to each other by two links 37. As shown in FIG. 6, one of the two links 37 is provided at a front-end portion of the supply tray 31 and the output tray 32 while the other of the two links 37 is provided at a rear-end portion of the supply tray 31 and the output tray 32. FIGS. 3-5 show a state in which the link 37 provided at the front-end portion of the supply tray 31 and the output tray 32 is viewed from the front of the device, and the following explanation will be made focusing on the front-side link 37 and its corresponding components.

The supply tray 31 is provided with arms 41 configured to pivot together with the supply tray 31. A shaft 42 corresponding to a first link point L1 is provided at one end of each arm 41, namely, at a portion of the supply tray 31 distant from the pivot center axis R1 by a predetermined distance. The link 37 has an elongate hole 44 extending right-left direction, and the shaft 42 penetrates or passes through the elongate hole 44. Thus, the supply tray 31 and the link 37 are coupled so as to be pivotable and slidable relative to each other. The output tray 32 is provided with arms 46 configured to pivot together with the output tray 32. The arm 46 and the link 37 are coupled, through a pin 47 corresponding to a second link point L2, at one end of the arm 46, namely, at a portion of the output tray 32 distant from the pivot center axis R2 by a predetermined distance.

The link 37, the arm 41, and the arm 46 cooperate with the ADF base 6A to constitute a four-bar linkage mechanism. The mechanism enables a movement of one of the supply tray 31 and the output tray 32 to be transmitted to the other of the supply tray 31 and the output tray 32, and the supply tray 31 and the output tray 32 are accordingly moved in conjunction with each other as explained below.

When the supply tray 31 is moved from the closed position to the open position in a state in which the supply tray 31 and the output tray 32 are located at the respective closed positions, the output tray 32 is moved from the closed position to the open position in conjunction with the supply tray 31. More specifically, when the supply tray 31 is operated such that the supply tray 31 is pivoted from the closed position toward the open position, the supply tray 31 is pivoted about the pivot center axis R1, and the arm 41 is pivoted together with the supply tray 31.

At this time, the shaft 42 which corresponds to the first link point L1 and which is kept in contact with an inner surface of the elongate hole 44 at one end of the elongate hole 44 (i.e., a left end in FIG. 3) pivots relative to the link 37 and pulls the one end of the elongate hole 44. The one end of the elongate hole 44 (i.e., the left end in FIG. 3) is pulled by the shaft 42 and is moved in a direction opposite to a direction toward the other end of the elongate hole 44 (i.e., a right end in FIG. 3), namely, the one end is moved leftward in FIG. 3, while somewhat moving also in the up-down direction.

Consequently, there acts, on the link 37, a force to move the link 37 leftward. At this time, the pin 47 corresponding to the second link point L2 is also pulled leftward. As a result, the arm 46 and the output tray 32 are pivoted about the pivot center axis R2, and the link 37 is moved from a first position (FIG. 3) to a second position (FIG. 4). Thus, the output tray 32 is moved from the closed position (FIG. 3) to the open position (FIG. 4) in conjunction with the movement of the supply tray 31 from the closed position (FIG. 3) to the open position (FIG. 4).

When the supply tray 31 and the output tray 32 are located at the respective open positions, the first surface 311 of the supply tray 31 and the second surface 322 of the output tray 32 face to each other with a space interposed therebetween. The sheet that has been conveyed by the conveyor 20 is output to a region between the first surface 311 of the supply tray 31 and the second surface 322 of the output tray 32.

When the output tray 32 is moved from the open position to the closed position in a state in which the supply tray 31 and the output tray 32 are located at the respective open positions, the components constituting the four-bar linkage mechanism are pivoted and slide in directions opposite to the directions of the movements of the components described above. Therefore, the supply tray 31 is moved from the open position to the closed position in conjunction with the movement of the output tray 32 from the open position to the closed position. That is, for moving both of the supply tray 31 and the output tray 32 from the closed position to the open position, the supply tray 31 is operated. For moving both of the supply tray 31 and the output tray 32 from the open position to the closed position, the output tray 32 is operated. Thus, by operating one of the supply tray 31 and the output tray 32, the other is moved in conjunction with the movement of the one of the supply tray 31 and the output tray 32.

When the supply tray 31 is moved from the open position to the closed position after the supply tray 31 and the output tray 32 have been moved to the respective open positions, the supply tray 31 is moved to the closed position whereas the output tray 32 is kept located at the open position. More specifically, when the supply tray 31 is operated such that the supply tray 31 is pivoted from the open position toward the closed position, the supply tray 31 is pivoted about the pivot center axis R1, and the arm 41 is pivoted together with the supply tray 31.

At this time, the shaft 42 corresponding to the first link point L1 moves along the inner surface of the elongate hole 44 from the one end of the elongate hole 44 (i.e., the left end in FIG. 3) toward the other end thereof (i.e., the right end in FIG. 3). In this instance, the link 37 pivots about the pin 47 corresponding to the second link point L2, but the link 37 does not move the pin 47, and the arm 46 and the output tray 32 do not pivot. As a result, the link 37 is moved from the second position (FIG. 4) to a third position (FIG. 5), and the supply tray 31 is accordingly moved from the open position (FIG. 4) to the closed position (FIG. 5) while the output tray 32 is kept located at the open position (FIGS. 4 and 5).

When the supply tray 31 is moved from the closed position to the open position in a state in which the output tray 32 is located at the open position, the components are pivoted and slide in directions opposite to the directions of the movements of the components described above. Therefore, the supply tray 31 can be moved from the closed position to the open position with the output tray 32 kept located at the open position. That is, when the output tray 32 is located at the open position, the supply tray 31 can be moved between the closed position and the open position as desired independently of the output tray 32 while the output tray 32 is kept located at the open position.

When the output tray 32 is moved from the open position to the closed position after the supply tray 31 has been moved to the closed position and the output tray 32 has been kept at the open position, the output tray 32 is moved to the closed position whereas the supply tray 31 is kept located at the closed position. More specifically, when the output tray 32 is operated such that the output tray 32 is pivoted from the open position toward the closed position, the output tray 32 is pivoted about the pivot center axis R2, and the arm 46 is pivoted together with the output tray 32.

At this time, the pin 47 corresponding to the second link point L2 moves the link 37. However, when the link 37 is moved, the elongate hole 44 pivots and slides relative to the shaft 42 corresponding to the first link point L1. Therefore, the link 37 is moved from the third position (FIG. 5) to the first position (FIG. 3) without moving the shaft 42. As a result, the output tray 32 is moved from the open position to the closed position whereas the supply tray 31 is kept located at the closed position (FIGS. 5 and 3).

When the output tray 32 is moved from the closed position to the open position in a state in which the supply tray 31 is located at the closed position, the components are pivoted and slide in directions opposite to the directions of the movements of the components described above. Therefore, the output tray 32 can be moved from the closed position to the open position with the supply tray 31 kept located at the closed position. That is, when the supply tray 31 is located at the closed position, the output tray 32 can be moved between the closed position and the open position as desired independently of the supply tray 31 while the supply tray 31 is kept located at the closed position.

Advantages

In the MFP 1 explained above, the first surfaces 311, 312 of the supply tray 31 and the output tray 32 partially define the exterior surface of the device, and the second surfaces 312, 322 of the supply tray 31 and the output tray 32 can support the sheet. Unlike a conventional arrangement in which a surface that partially defines the exterior surface functions also as a sheet support surface, even if the first surfaces 311, 321 are stained with stains attached thereto when used as the exterior surface, the sheet is not supported by the stained surfaces. Consequently, both of the sheet before being conveyed and the sheet after having been conveyed can be prevented from being stained.

Unlike the conventional arrangement in which the surface that partially defines the exterior surface functions also as the sheet support surface, even if the second surfaces 312, 322 configured to support the sheet suffer from flaws or scratches due to contact with the sheet, the first surfaces 311, 321 functioning as the exterior surface are not likely to suffer from such flaws or scratches. It is thus possible to reduce a risk of impairing aesthetic appearance of the exterior surface due to flaws or scratches.

When the supply tray 31 is moved from the closed position to the open position in the state in which the supply tray 31 and the output tray 32 are located at the respective closed positions, the output tray 32 is moved from the closed position to the open position in conjunction with the supply tray 31. Consequently, it is not necessary to additionally move the output tray 32, so that both of the supply tray 31 and the output tray 32 can be easily moved to the respective open positions.

Even when the supply tray 31 is moved from the open position to the closed position in the state in which the supply tray 31 and the output tray 32 are located at the respective open positions, the output tray 32 is not moved from the open position. Consequently, when the supply tray 31 is moved to the closed position, the supply tray 31 can be solely moved to the closed position whereas when the supply tray 31 is moved to the open position, the output tray 32 is moved to the open position in conjunction with the supply tray 31. Thus, the sheet supported in the region between the supply tray 31 and the output tray 32 can be easily taken out of the output tray 32 by moving the supply tray 31 to the closed position.

Even when the output tray 32 is moved from the closed position to the open position in the state in which the supply tray 31 and the output tray 32 are located at the respective closed positions, the supply tray 31 is not moved from the closed position. Consequently, when the output tray 32 is moved to the open position, the output tray 32 can be solely moved to the open position whereas when the supply tray 31 is moved to the open position, the output tray 32 is moved to the open position in conjunction with the supply tray 31. Therefore, in an instance where a small-size sheet is output to the output tray 32 and the output tray 32 is then moved to the closed position with the small-size sheet left on the output tray 32 without being noticed, the sheet left on the output tray 32 can be taken out therefrom by opening only the output tray 32 afterward.

When the output tray 32 is moved from the open position to the closed position in the state in which the supply tray 31 and the output tray 32 are located at the respective open positions, the supply tray 31 is moved from the open position to the closed position in conjunction with the output tray 32. Consequently, when the output tray 32 is moved to the closed position, both of the supply tray 31 and the output tray 32 are easily moved to the closed position whereas when the supply tray 31 is moved to the closed position, the supply tray 31 is solely moved.

In the present embodiment that uses the shaft 42 and the elongate hole 44 described above, the output tray 32 can be moved to the open position in conjunction with the supply tray 31 when the supply tray 31 is moved to the open position, and the supply tray 31 can be solely moved to the closed position when the supply tray 31 is moved to the closed position, without using any excessively complex mechanism.

2. Second Embodiment

There will be next explained a second embodiment. Since the second embodiment is similar in construction to the first embodiment, the second embodiment will be explained focusing on differences therebetween. The same reference numerals as used in the first embodiment will be used in the second embodiment to identify the corresponding components, and detailed explanation thereof is dispensed with.

In the second embodiment, a link mechanism for the supply tray 31 and the output tray 32 similar to that in the first embodiment is provided by a configuration different from that of the first embodiment using the link 37.

Figure 7:
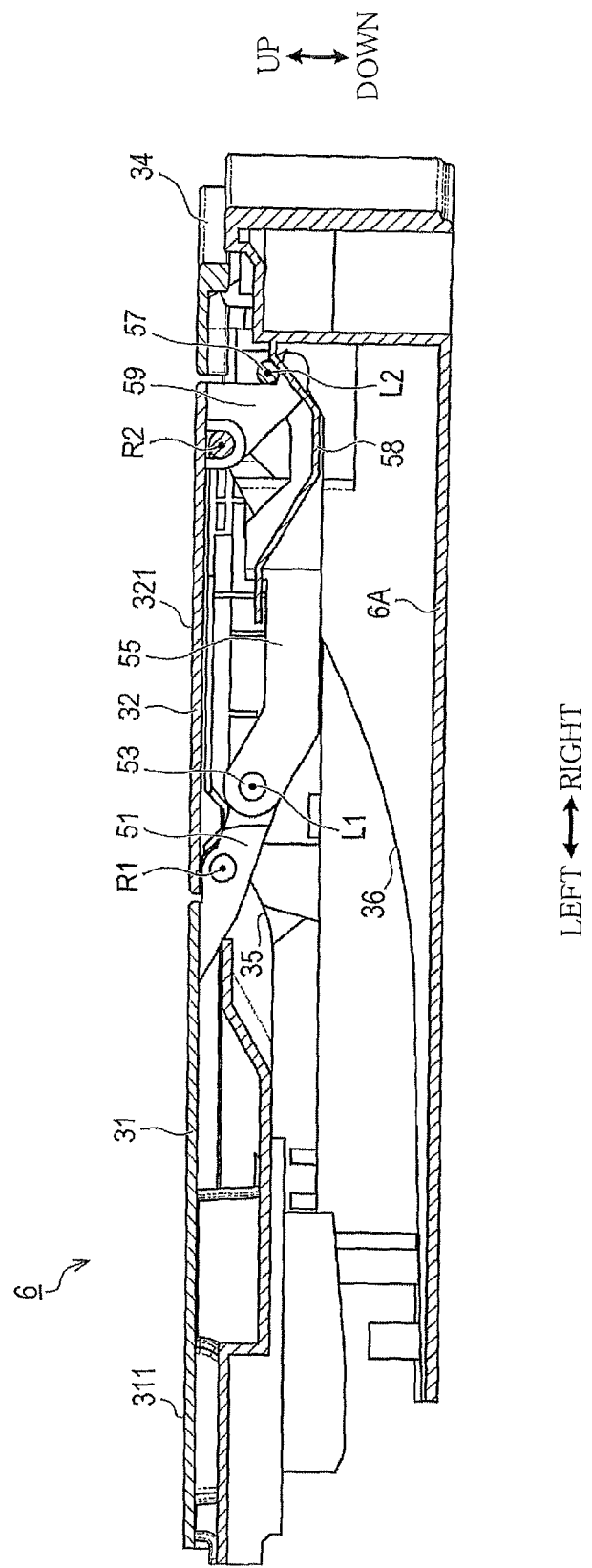
FIG. 7 is a vertical cross-sectional view showing the main portion of the MFP of a second embodiment in a state in which the supply tray and the output tray are located at the respective closed positions.
Figure 8:
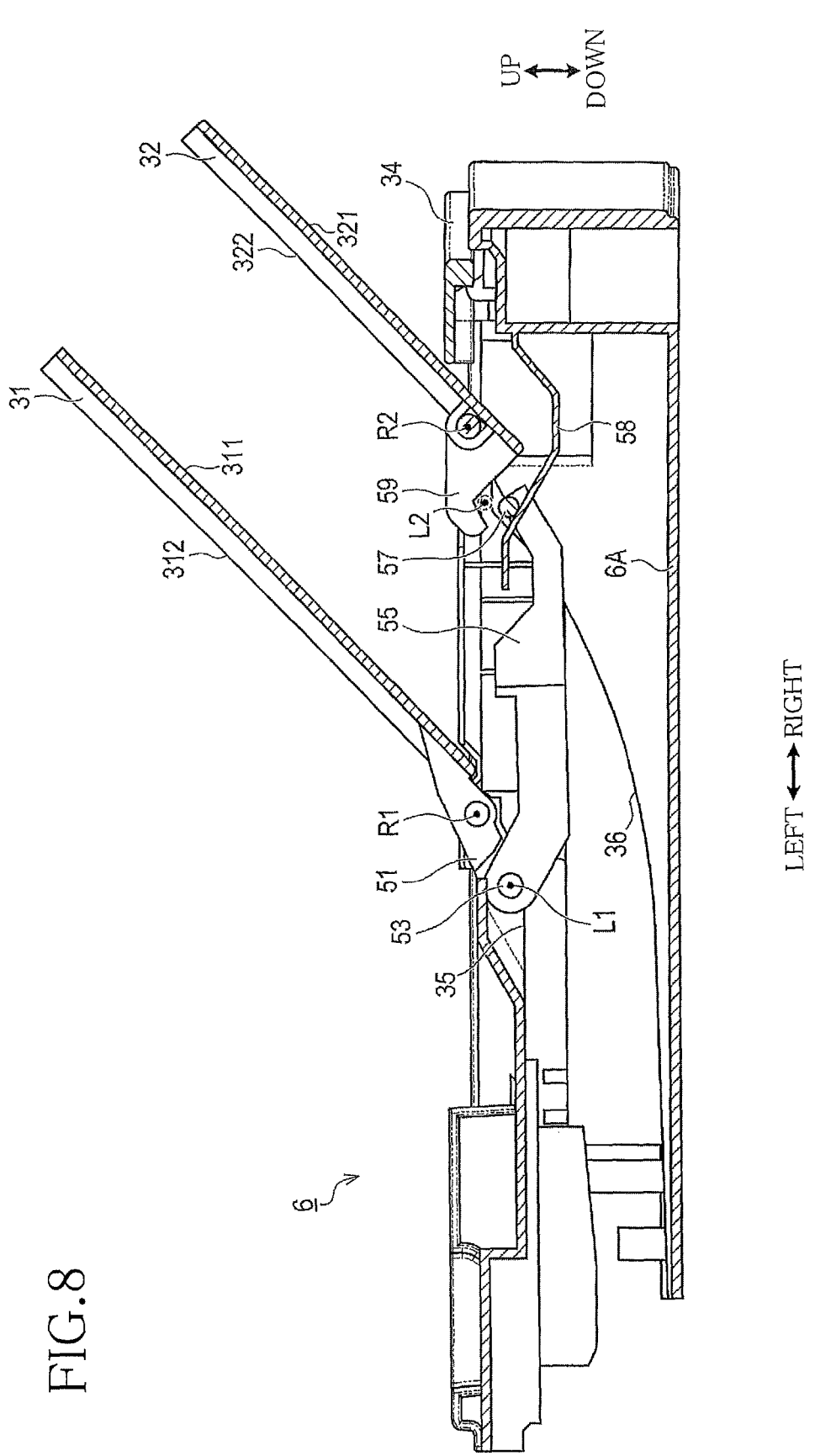
FIG. 8 is a vertical cross-sectional view showing the main portion of the MFP of the second embodiment in a state in which the supply tray and the output tray are located at the respective open positions.
Figure 9:
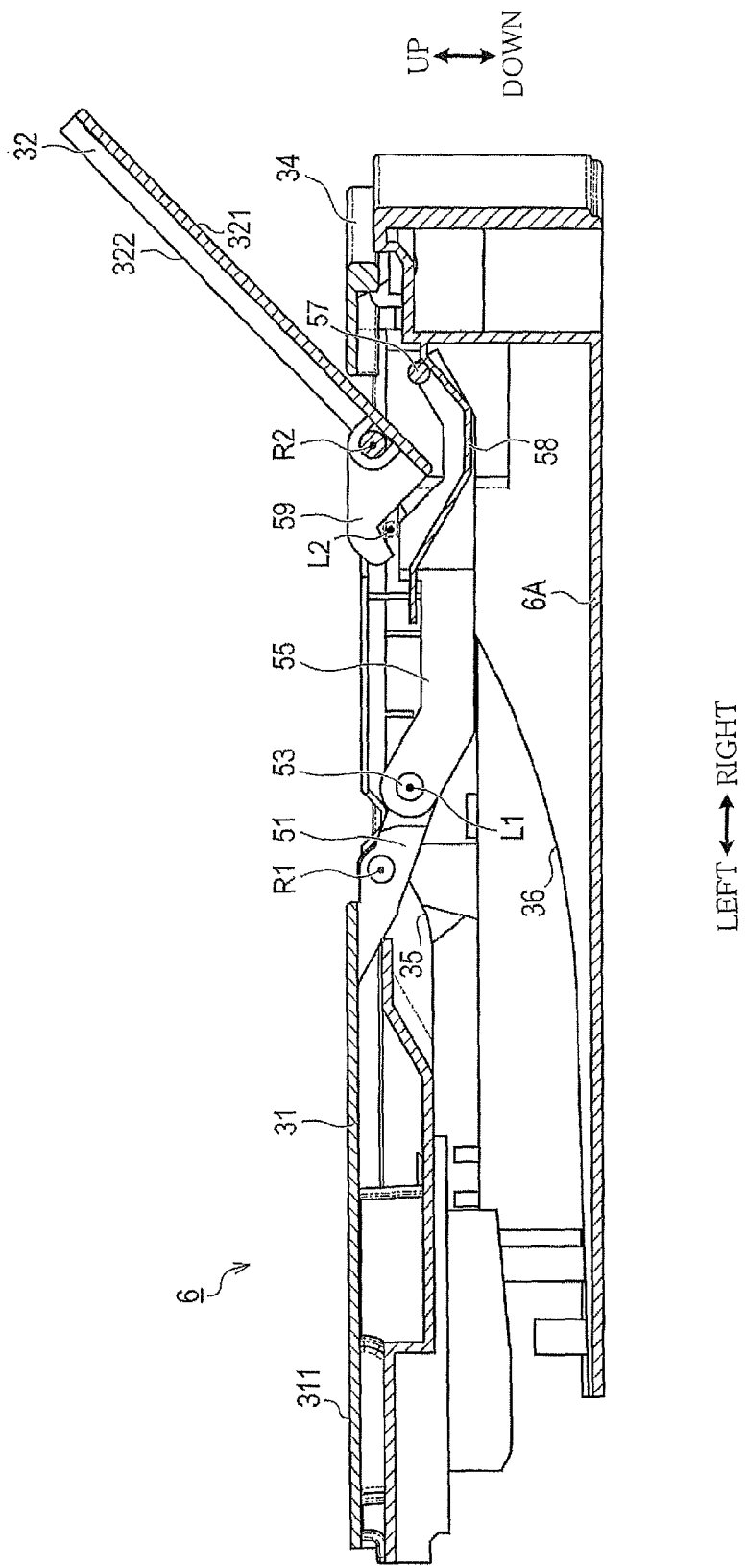
FIG. 9 is a vertical cross-sectional view showing the main portion of the MFP of the second embodiment in a state in which the supply tray is located at the closed position and the output tray is located at the open position.

In the ADF unit 6 according to the second embodiment, the supply tray 31 is provided with arms 51 configured to pivot together with the supply tray 31, as shown in FIGS. 7-9. A link 55 is pivotally coupled, through a pin 53 corresponding to the first link point L1, to the arm 51 at one end of the arm 51, namely, at a portion of the supply tray 31 distant from the pivot center axis R1 by a predetermined distance. The link 55 has a shaft 57. As in the first embodiment, the following explanation will be made focusing on a front-side one of the two links 55 and its corresponding components.

The shaft 57 is placed on a guide 58 formed of resin integrally with the ADF base 6A. When the link 55 moves, the shaft 57 moves along an upper surface of the guide 58. As shown in FIG. 7, the output tray 32 is provided with hooks 59 configured to be engageable with the corresponding shafts 57. In a state in which the hook 59 is held in engagement with the shaft 57, the hook 59 is pivotable about the shaft 57, and the pivot center of the shaft 57 corresponds to the second link point L2.

When the output tray 32 is located at the closed position, the hook 59 is held in engagement with the shaft 57. When the output tray 32 is moved to the open position, the hook 59 is disengaged from the shaft 57, as shown in FIGS. 8 and 9. The shaft 57 is kept placed on the guide 58 even when the hook 59 is disengaged from the shaft 57, and the shaft 57 does not move downward beyond the guide 58. Thus, the shaft 57 is held at a position at which the hook 59 can engage with the shaft 57 when the output tray 32 is moved to the closed position.

The link 55, the arm 51, and the hook 59 cooperate with the ADF base 6A to constitute a four-bar linkage mechanism. The mechanism enables a movement of one of the supply tray 31 and the output tray 32 to be transmitted to the other of the supply tray 31 and the output tray 32, and the supply tray 31 and the output tray 32 are accordingly moved in conjunction with each other as explained below.

When the supply tray 31 is moved from the closed position to the open position in a state in which the supply tray 31 and the output tray 32 are located at the respective closed positions, the supply tray 31 is pivoted about the pivot center axis R1, and the pin 53 corresponding to the first link point L1 is moved together with the supply tray 31 and the link 55 is thereby moved leftward. At this time, the shaft 57 is moved leftward together with the link 55, so that the hook 59 that is held in engagement with the shaft 57 is pulled leftward. The hook 59 that has received the leftward force is pivoted about the pivot center axis R2 together with the output tray 32, and the output tray 32 is moved from the closed position toward the open position.

At an initial stage of the movement of the output tray 32 from the closed position toward the open position, the output tray 32 is moved by the force received from the hook 59. Thereafter, the output tray 32 is pivoted clockwise in FIG. 7. After the center of gravity of the output tray 32 has reached an upper right of the pivot center axis R2, the output tray 32 is pivoted by its own weight and finally reaches the open position. At this time, the hook 59 is disengaged from the shaft 57, as shown in FIG. 8.

The supply tray 31 is moved from the open position to the closed position in a state in which the supply tray 31 and the output tray 32 are located at the respective open positions, the first link point L1 that moves together with the supply tray 31 moves the link 55 rightward. It is noted, however, that the shaft 57 moves together with the link 55 along the guide 58 in a state in which the hook 59 is disengaged from the shaft 57. Consequently, even though the supply tray 31 is moved from the open position to the closed position, the output tray 32 is kept located at the open position, as shown in FIG. 9. In this respect, when the supply tray 31 is moved from the closed position to the open position in a state in which the output tray 32 is located at the open position, the components are pivoted or slide in directions opposite to the directions of the movements of the components described above, so that the output tray 32 is not moved in conjunction with the supply tray 31. That is, when the output tray 32 is located at the open position, the supply tray 31 can be moved between the closed position and the open position as desired independently of the output tray 32 while the output tray 32 is kept located at the open position.

When the output tray 32 is moved from the open position to the closed position in a state in which the supply tray 31 is located at the closed position and the output tray 32 is located at the open position, the hook 59 is moved together with the output tray 32 such that the state of the output tray 32 and the hook 59 shown in FIG. 9 changes to the state shown in FIG. 7. As a result, the hook 59 returns to its position at which the hook 59 engages with the shaft 57.

The ADF unit 6 according to the second embodiment offers the same advantages as in the first embodiment. In other words, the elongate hole 44 illustrated in the first embodiment is not essential for constituting the link mechanism for the supply tray 31 and the output tray 32 configured to move as described above. In the first embodiment, the first link point L1 and the link 37 move relative to each other at a portion of the link 37 at which the first link point L1 is present. As in the second embodiment, the second link point L2 and the link 55 may move relative to each other at a portion of the link 55 at which the second link point L2 is present.

3. Other Embodiments

While the embodiments have been described above, it is to be understood that the invention is not limited to the details of the illustrated embodiments, but may be embodied with various other changes without departing from the spirit and the scope of the invention.

In the illustrated embodiment, the elongate hole 44 is provided at a portion of the link 37 near the first link point L1. A configuration equivalent to the elongate hole 44 may be provided at a portion of the link 37 at which the second link point L2 is present. In the illustrated second embodiment, the hook 59 is provided at a portion of the link 55 at which the second link point L2 is present. A configuration equivalent to the hook 59 may be provided at a portion of the link 55 at which the first link point L1 is present.

In the illustrated embodiments, the ADF unit 6 of the MFP 1 is illustrated as one example of the sheet conveying device. The sheet conveying device need not be a part of the MFP. For instance, the above-described configuration may be used in an image reading apparatus, a copying machine, or a facsimile machine, each having a single function.

4. Supplemental Explanation

It can be understood that the sheet conveying device and the image reading apparatus explained above may have the following configurations based on the illustrated embodiments.

In the sheet conveying device or the image reading apparatus, when the first supporter is moved from the closed position to the open position in a state in which the first supporter and the second supporter are located at the respective closed positions, the link is moved from a first position to a second position by a force that acts thereon from the first supporter, so that the second supporter is moved from the closed position to the open position by a force that acts thereon from the link.

In the sheet conveying device or the image reading apparatus, when the first supporter is moved from the open position to the closed position in a state in which the first supporter and the second supporter are located at respective open positions, the link is moved from the second position to a third position by a force that acts thereon from the first supporter, such that the link is moved relative to the second supporter with the second supporter kept located at the open position.

According to the sheet conveying device or the image reading apparatus constructed as described above, even when the first supporter is moved from the open position to the closed position, the second supporter is not moved from the open position. Consequently, when the first supporter is moved to the closed position, the first supporter can be solely moved to the closed position whereas when the first supporter is moved to the open position, the second supporter is moved to the open position in conjunction with the first supporter.

In the sheet conveying device or the image reading apparatus, when the first supporter and the second supporter are located at the respective open positions, the first surface of the first supporter and the second surface of the second supporter face to each other with a space interposed therebetween, and the sheet conveying device is configured such that the conveyor outputs the sheet that has been conveyed by the conveyor, to a region between the first surface of the first supporter and the second surface of the second supporter.

According to the sheet conveying device or the image reading apparatus constructed as described above, the sheet supported in the region between the first supporter and the second supporter can be easily taken out of the second supporter by moving the first supporter to the closed position.

In the sheet conveying device or the image reading apparatus, when the second supporter is moved from the closed position to the open position in a state in which the first supporter and the second supporter are located at the respective closed positions, the link is moved from the first position to the third position by a force that acts thereon from the second supporter, such that the link is moved relative to the first supporter with the first supporter kept located at the closed position.

According to the sheet conveying device or the image reading apparatus constructed as described above, even when the second supporter is moved from the closed position to the open position, the first supporter is not moved from the closed position. Consequently, when the second supporter is moved to the open position, the second supporter can be solely moved to the open position whereas when the first supporter is moved to the open position, the second supporter is moved to the open position in conjunction with the first supporter.

In the sheet conveying device or the image reading apparatus, when the second supporter is moved from the open position to the closed position in the state in which the first supporter and the second supporter are located at the respective open positions, the link is moved from the second position to the first position by a force that acts thereon from the second supporter, so that the first supporter is moved from the open position to the closed position by a force that acts thereon from the link.

According to the sheet conveying device or the image reading apparatus constructed as described above, when the second supporter is moved from the open position to the closed position in the state in which the first supporter and the second supporter are located at the respective open positions, the first supporter is moved from the open position to the closed position in conjunction with the second supporter. Consequently, when the second supporter is moved to the closed position, both of the first supporter and the second supporter can be easily moved to the closed position whereas when the first supporter is moved to the closed position, the first supporter is solely moved.

In the sheet conveying device or the image reading apparatus, the first supporter and the second supporter are pivotally supported, and the link cooperates with the first supporter and the second supporter to constitute a four-bar linkage mechanism in which a portion of the first supporter distant from a pivot center thereof by a predetermined distance functions as a first link point while a portion of the second supporter distant from a pivot center thereof by a predetermined distance functions as a second link point. When the first supporter is moved from the closed position to the open position, the four-bar linkage mechanism transmits the force from the first supporter to the second supporter and thereby moves the second supporter from the closed position to the open position in conjunction with the first supporter.

According to the sheet conveying device or the image reading apparatus constructed as described above, the second supporter can be moved from the closed position to the open position in conjunction with the first supporter by utilizing the four-bar linkage mechanism constituted by the link, the first supporter, and the second supporter.

In the sheet conveying device or the image reading apparatus, when the first supporter is moved from the closed position to the open position, one of the first link point and the second link point and the link keep a state in which the one of the first link point and the second link point and the link pivot relative to each other about a predetermined axis as a pivot center, so as to constitute a part of the four-bar linkage mechanism. When the first supporter is moved from the open position to the closed position, the one of the first link point and the second link point and the link move relative to each other in a direction orthogonal to the predetermined axis, so as to allow the first supporter to be moved from the open position to the closed position with the second supporter kept located at the open position.

According to the sheet conveying device or the image reading apparatus constructed as described above, one of the first link point and the second link point and the link function as the pivot center when the first supporter is moved to the open position. On the other hand, one of the first link point and the second link point and the link move relative to each other when the first supporter is moved from the open position to the closed position, whereby the second supporter is not moved from the open position. Consequently, when the first supporter is moved to the closed position, the first supporter can be solely moved to the closed position whereas when the first supporter is moved to the open position, the second supporter is moved to the open position in conjunction with the first supporter.

In the sheet conveying device or the image reading apparatus, the first supporter has a shaft functioning as the first link point, and the link has an elongate hole through which the shaft passes. When the first supporter is moved from the closed position to the open position in a state in which the first supporter and the second supporter are located at the respective closed positions, the shaft moves together with the first supporter such that the shaft, which is in contact with one end of the elongate hole, moves the one end of the elongate hole in a direction opposite to a direction toward the other end of the elongate hole so as to move the link, and the link in turn moves the second link point, so that the second supporter is moved from the closed position to the open position. When the first supporter is moved from the open position to the closed position in a state in which the first supporter and the second supporter are located at the respective open positions, the shaft moves along the elongate hole from the one end of the elongate hole toward the other end thereof, so that the first supporter is moved from the open position to the closed position with the second supporter kept located at the open position. When the second supporter is moved from the open position to the closed position in a state in which the first supporter is located at the closed position and the second supporter is located at the open position, the link moves together with the second link point such that the elongate hole of the link moves relative to the shaft without moving the shaft, so that the link moves with the first supporter kept located at the closed position.

According to the sheet conveying device or the image reading apparatus that employs the shaft and the elongate hole described above, the second supporter can be moved to the open position in conjunction with the first supporter when the first supporter is moved to the open position, and the first supporter can be solely moved to the closed position when the first supporter is moved to the closed position.

In the sheet conveying device or the image reading apparatus, the link has a shaft, and the second supporter has a hook functioning as the second link point. When the first supporter is moved from the closed position to the open position in a state in which the first supporter and the second supporter are located at the respective closed positions, the first link point that moves together with the first supporter moves the link, and the shaft that moves together with the link moves the hook that is held in engagement with the shaft, so that the second supporter is moved from the closed position to the open position while the hook is disengaged from the shaft before the second supporter reaches the open position. When the first supporter is moved from the open position to the closed position in a state in which the first supporter and the second supporter are located at the respective open positions, the shaft moves together with the link in a state in which the hook is disengaged from the shaft whereas the first link point that moves together with the first supporter moves the link. As a result, the first supporter is moved from the open position to the closed position with the second supporter kept located at the open position. When the second supporter is moved from the open position to the closed position in a state in which the first supporter is located at the closed position and the second supporter is located at the open position, the hook moves together with the second supporter such that the hook is moved to a position at which the hook engages with the shaft.

According to the sheet conveying device or the image reading apparatus that uses the shaft and the hook described above, the second supporter can be moved to the open position in conjunction with the first supporter when the first supporter is moved to the open position, and the first supporter can be solely moved to the closed position when the first supporter is moved to the closed position.

What is claimed is:

1. A sheet conveying device, comprising:
   a conveyor configured to convey a sheet along a conveyance path;
   a first supporter configured to be moved between a closed position and an open position and having a first surface and a second surface opposite to the first surface, the first supporter being configured such that, when located at the closed position, the first surface partially forms an exterior surface of the sheet conveying device and such that, when located at the open position, the second surface supports the sheet to be supplied to the conveyor;
   a second supporter configured to be moved between a closed position and an open position and having a first surface and a second surface opposite to the first surface, the second supporter being configured such that, when located at the closed position, the first surface partially forms the exterior surface of the sheet conveying device and such that, when located at the open position, the second surface supports the sheet output from the conveyor; and
   a link configured such that, when the first supporter is moved from the closed position to the open position, the link transmits a force from the first supporter to the second supporter and thereby moves the second supporter from the closed position to the open position in conjunction with the first supporter,
   wherein, when the first supporter is moved from the closed position to the open position in a state in which the first supporter and the second supporter are located at the respective closed positions, the link is moved from a first position to a second position by a force that acts thereon from the first supporter, so that the second supporter is moved from the closed position to the open position by a force that acts thereon from the link,
   wherein, when the first supporter is moved from the open position to the closed position in a state in which the first supporter and the second supporter are located at respective open positions, the link is moved from the second position to a third position by a force that acts thereon from the first supporter, such that the link is moved relative to the second supporter with the second supporter kept located at the open position,
   wherein, when the first supporter and the second supporter are located at the respective open positions, the first surface of the first supporter and the second surface of the second supporter face to each other with a space interposed therebetween, and
   wherein the sheet conveying device is configured such that the conveyor outputs the sheet that has been conveyed by the conveyor, to a region between the first surface of the first supporter and the second surface of the second supporter.

2. The sheet conveying device according to claim 1, wherein, when the second supporter is moved from the open position to the closed position in the state in which the first supporter and the second supporter are located at the respective open positions, the link is moved from the second position to the first position by a force that acts thereon from the second supporter, so that the first supporter is moved from the open position to the closed position by a force that acts thereon from the link.

3. The sheet conveying device according to claim 1, wherein the first supporter is pivotable about a pivot center thereof while the second supporter is pivotable about a pivot center thereof, the pivot centers of the first supporter and the second supporter being parallel to each other and spaced apart from each other in a direction in which the sheet is conveyed.

4. The sheet conveying device according to claim 1, wherein the first supporter and the second supporter are pivotable in the same direction.

5. The sheet conveying device according to claim 1, wherein, when the first supporter and the second supporter are located at the respective closed positions, the first surface of the first supporter and the first surface of the second supporter form the exterior surface of the sheet conveying device.

6. The sheet conveying device according to claim 1, wherein, when the second supporter is located at the closed position, the link is located at a position at which the link is covered with the second supporter.

7. A sheet conveying device, comprising:
a conveyor configured to convey a sheet along a conveyance path;
a first supporter configured to be moved between a closed position and an open position and having a first surface and a second surface opposite to the first surface, the first supporter being configured such that, when located at the closed position, the first surface partially forms an exterior surface of the sheet conveying device and such that, when located at the open position, the second surface supports the sheet to be supplied to the conveyor;
a second supporter configured to be moved between a closed position and an open position and having a first surface and a second surface opposite to the first surface, the second supporter being configured such that, when located at the closed position, the first surface partially forms the exterior surface of the sheet conveying device and such that, when located at the open position, the second surface supports the sheet output from the conveyor; and
a link configured such that, when the first supporter is moved from the closed position to the open position, the link transmits a force from the first supporter to the second supporter and thereby moves the second supporter from the closed position to the open position in conjunction with the first supporter,
wherein, when the first supporter is moved from the closed position to the open position in a state in which the first supporter and the second supporter are located at the respective closed positions, the link is moved from a first position to a second position by a force that acts thereon from the first supporter, so that the second supporter is moved from the closed position to the open position by a force that acts thereon from the link,
wherein, when the first supporter is moved from the open position to the closed position in a state in which the first supporter and the second supporter are located at respective open positions, the link is moved from the second position to a third position by a force that acts thereon from the first supporter, such that the link is moved relative to the second supporter with the second supporter kept located at the open position, and
wherein, when the second supporter is moved from the closed position to the open position in a state in which the first supporter and the second supporter are located at the respective closed positions, the link is moved from the first position to the third position by a force that acts thereon from the second supporter, such that the link is moved relative to the first supporter with the first supporter kept located at the closed position.

8. The sheet conveying device according to claim 7, wherein, when the second supporter is moved from the open position to the closed position in the state in which the first supporter and the second supporter are located at the respective open positions, the link is moved from the second position to the first position by a force that acts thereon from the second supporter, so that the first supporter is moved from the open position to the closed position by a force that acts thereon from the link.

9. The sheet conveying device according to claim 7, wherein the first supporter is pivotable about a pivot center thereof while the second supporter is pivotable about a pivot center thereof, the pivot centers of the first supporter and the second supporter being parallel to each other and spaced apart from each other in a direction in which the sheet is conveyed.

10. The sheet conveying device according to claim 7, wherein the first supporter and the second supporter are pivotable in the same direction.

11. The sheet conveying device according to claim 7, wherein, when the first supporter and the second supporter are located at the respective closed positions, the first surface of the first supporter and the first surface of the second supporter form the exterior surface of the sheet conveying device.

12. The sheet conveying device according to claim 7, wherein, when the second supporter is located at the closed position, the link is located at a position at which the link is covered with the second supporter.

13. A sheet conveying device, comprising:
a conveyor configured to convey a sheet along a conveyance path;
a first supporter configured to be moved between a closed position and an open position and having a first surface and a second surface opposite to the first surface, the first supporter being configured such that, when located at the closed position, the first surface partially forms an exterior surface of the sheet conveying device and such that, when located at the open position, the second surface supports the sheet to be supplied to the conveyor;
a second supporter configured to be moved between a closed position and an open position and having a first surface and a second surface opposite to the first surface, the second supporter being configured such that, when located at the closed position, the first surface partially forms the exterior surface of the sheet conveying device and such that, when located at the open position, the second surface supports the sheet output from the conveyor; and
a link configured such that, when the first supporter is moved from the closed position to the open position, the link transmits a force from the first supporter to the second supporter and thereby moves the second supporter from the closed position to the open position in conjunction with the first supporter,
wherein the first supporter and the second supporter are pivotally supported,
wherein the link cooperates with the first supporter and the second supporter to constitute a four-bar linkage mechanism in which a portion of the first supporter distant from a pivot center thereof by a predetermined distance functions as a first link point while a portion of the second supporter distant from a pivot center thereof by a predetermined distance functions as a second link point, and
wherein, when the first supporter is moved from the closed position to the open position, the four-bar linkage mechanism transmits the force from the first supporter to the second supporter and thereby moves the second supporter from the closed position to the open position in conjunction with the first supporter.

14. The sheet conveying device according to claim 13, wherein, when the first supporter is moved from the closed position to the open position, one of the first link point and the second link point and the link keep a state in which the one of the first link point and the second link point and the link pivot relative to each other about a predetermined axis as a pivot center, so as to constitute a part of the four-bar linkage mechanism, and wherein, when the first supporter is moved from the open position to the closed position, the one of the first link point and the second link point and the link move relative to each other in a direction orthogonal to the predetermined axis, so as to allow the first supporter to be moved from the open position to the closed position with the second supporter kept located at the open position.

15. The sheet conveying device according to claim 14, wherein the first supporter has a shaft functioning as the first link point, and the link has an elongate hole through which the shaft passes, wherein, when the first supporter is moved from the closed position to the open position in a state in which the first supporter and the second supporter are located at the respective closed positions, the shaft moves together with the first supporter such that the shaft, which is in contact with an inner surface of the elongate hole at one end of the elongate hole, moves the one end of the elongate hole in a direction opposite to a direction toward the other end of the elongate hole so as to move the link, and the link in turn moves the second link point, so that the second supporter is moved from the closed position to the open position, wherein, when the first supporter is moved from the open position to the closed position in a state in which the first supporter and the second supporter are located at the respective open positions, the shaft moves along the elongate hole from the one end of the elongate hole toward the other end thereof so that the first supporter is moved from the open position to the closed position with the second supporter kept located at the open position, and wherein, when the second supporter is moved from the open position to the closed position in a state in which the first supporter is located at the closed position and the second supporter is located at the open position, the link moves together with the second link point such that the elongate hole of the link moves relative to the shaft without moving the shaft, so that the link moves with the first supporter kept located at the closed position.

16. The sheet conveying device according to claim 14, wherein the link has a shaft, and the second supporter has a hook functioning as the second link point, wherein, when the first supporter is moved from the closed position to the open position in a state in which the first supporter and the second supporter are located at the respective closed positions, the first link point that moves together with the first supporter moves the link, and the shaft that moves together with the link moves the hook that is held in engagement with the shaft, so that the second supporter is moved from the closed position to the open position while the hook is disengaged from the shaft before the second supporter reaches the open position, wherein, when the first supporter is moved from the open position to the closed position in a state in which the first supporter and the second supporter are located at the respective open positions, the first link point that moves together with the first supporter moves the link whereas the shaft moves together with the link in a state in which the hook is disengaged from the shaft, so that the first supporter is moved from the open position to the closed position with the second supporter kept located at the open position, and wherein, when the second supporter is moved from the open position to the closed position in a state in which the first supporter is located at the closed position and the second supporter is located at the open position, the hook moves together with the second supporter such that the hook is moved to a position at which the hook engages with the shaft.

17. The sheet conveying device according to claim 13, wherein the first supporter is pivotable about a pivot center thereof while the second supporter is pivotable about a pivot center thereof, the pivot centers of the first supporter and the second supporter being parallel to each other and spaced apart from each other in a direction in which the sheet is conveyed.

18. The sheet conveying device according to claim 13, wherein the first supporter and the second supporter are pivotable in the same direction.

19. The sheet conveying device according to claim 13, wherein, when the first supporter and the second supporter are located at the respective closed positions, the first surface of the first supporter and the first surface of the second supporter form the exterior surface of the sheet conveying device.

20. The sheet conveying device according to claim 13, wherein, when the second supporter is located at the closed position, the link is located at a position at which the link is covered with the second supporter.

* * * * *